June 17, 1952 H. B. STUART 2,600,443
COIN CONTROLLED CHANGE MAKER
Filed June 15, 1945 12 Sheets-Sheet 1

INVENTOR.
Homer B. Stuart
BY Francis O. Hardesty
Attorney

Fig. 4

June 17, 1952 H. B. STUART 2,600,443
COIN CONTROLLED CHANGE MAKER
Filed June 15, 1945 12 Sheets-Sheet 4

INVENTOR.
Homer B. Stuart
BY
Francis D. Hardesty
ATTORNEY

June 17, 1952 H. B. STUART 2,600,443
COIN CONTROLLED CHANGE MAKER
Filed June 15, 1945 12 Sheets-Sheet 5

INVENTOR.
Homer B. Stuart
BY Francis D Hardesty
ATTORNEY

June 17, 1952  H. B. STUART  2,600,443
COIN CONTROLLED CHANGE MAKER
Filed June 15, 1945  12 Sheets-Sheet 6

INVENTOR.
Homer B. Stuart
BY Francis A. Hardesty
Attorney

June 17, 1952    H. B. STUART    2,600,443
COIN CONTROLLED CHANGE MAKER
Filed June 15, 1945    12 Sheets-Sheet 7

INVENTOR.
Homer B. Stuart
BY Francis D. Hardesty
ATTORNEY

June 17, 1952 H. B. STUART 2,600,443
COIN CONTROLLED CHANGE MAKER
Filed June 15, 1945 12 Sheets-Sheet 8

INVENTOR.
Homer B. Stuart
BY Francis O. Hardesty
ATTORNEY

June 17, 1952  H. B. STUART  2,600,443
COIN CONTROLLED CHANGE MAKER

Filed June 15, 1945  12 Sheets-Sheet 9

INVENTOR.
Homer B. Stuart

BY Frances D. Hardesty

ATTORNEY

June 17, 1952          H. B. STUART          2,600,443

COIN CONTROLLED CHANGE MAKER

Filed June 15, 1945          12 Sheets-Sheet 11

INVENTOR.
Homer B. Stuart

BY
Francis D. Hardesty

ATTORNEY

INVENTOR.
Homer B. Stuart
BY Francis D. Hardesty
Attorney

Patented June 17, 1952

2,600,443

UNITED STATES PATENT OFFICE 2,600,443

COIN CONTROLLED CHANGE MAKER

Homer B. Stuart, Grosse Pointe, Mich., assignor to Advance Products Co., Detroit, Mich., a corporation of Michigan Application June 15, 1945, Serial No. 599,701

5 Claims. (Cl. 194—10)

The present invention relates to fare registers or the like for use on common carriers for passengers, places of amusement or the like.

Among the objects of the invention is a register which will not only register fares as deposited in correct amounts, but will act as a change maker and return to the depositor the excess over the amount of the fare when a larger-than-fare coin is deposited.

Another object is a register which permits the attendant to inspect the coin deposited before registration and change making.

Another object is a device of the kind described which may be easily and quickly adapted for receiving and registering fares of a different amount.

Still other objects and advantages will be apparent to those skilled in the art upon reference to the following description and accompanying drawings in which.

Figure 1:
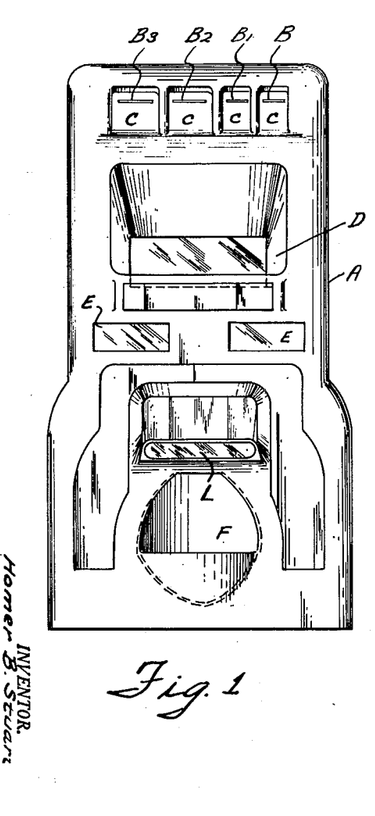
Figure 1 is a front elevation of the complete device for electrical operation.
Figure 2:
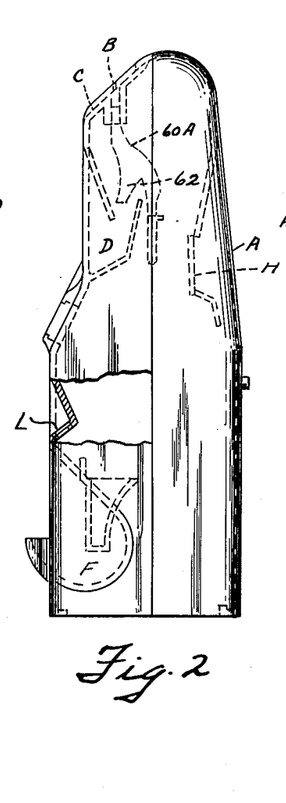
Figure 2 is a side elevation of the same.
Figure 3:
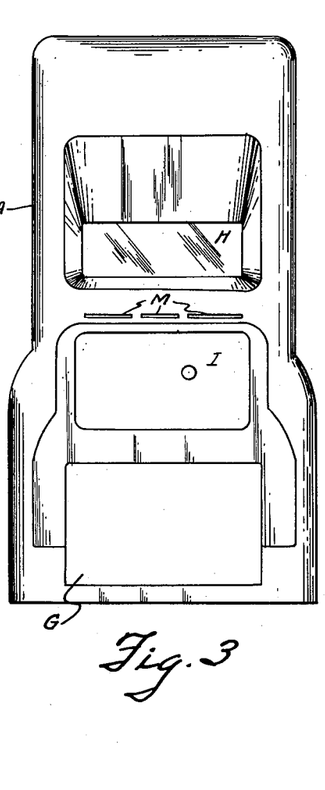
Figure 3 is a rear elevation of the same.

As indicated in the drawings, the mechanism is enclosed in a suitable housing A such as is shown in Figures 1 to 3 in which Figure 1 shows the front or fare depositor's view of the complete machine; Figure 2 shows a side view; and Figure 3 shows the attendant's side.

Near the top of the housing A are located the several slots B, B1, B2, B3, into which are inserted the coins indicated by suitable labelling in the adjacent depressed areas C. This labelling may of course be by stamping, transferring or other suitable means.

Directly below the fare slots is a pocket D into which will drop improperly inserted fares and from which the depositor may remove them, and below the pocket D are windows E through which are visible the registers.

Near the bottom of the housing is a change receiving pocket F into which falls the change to be returned to the depositor when he has inserted a coin of greater value than a fare.

The rear of casing A will be provided with a suitable door at G from which accumulated fares may be removed.

At the proper level is located a transparent section H and the portion D1 of the rear wall of pocket D may also be transparent so that the attendant may observe the character of a deposited coin of larger than the fare amount, before causing the operation of the mechanism.

Suitable slots M provide openings through which an attendant may insert a supply of change before fares are to be registered.

And lastly, at L may be a suitable illuminated sign indicating the change pocket F.

Figure 4:
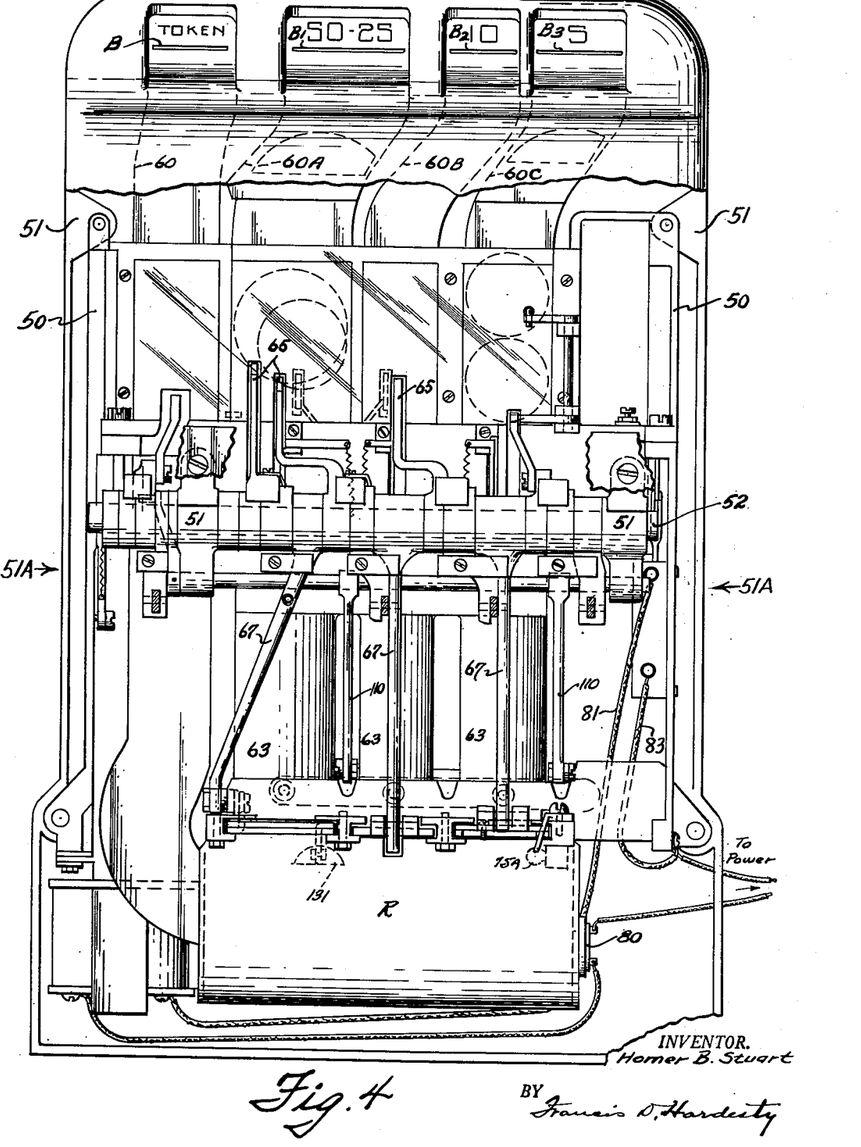
Figure 4 is a front elevation of the mechanism.

As indicated in Figure 4, the machine, as illustrated, is adapted for a five cent fare and will receive nickels, dimes, quarters, half dollars, and tokens, the quarters and half dollars going into the same chute.

The mechanism of the machine is assembled as a unit on a suitable frame 50 fixed to lugs 51 in the front portion of the divided housing A, with the several parts to be described registering with the housing elements. Across the front of frame 50 in suitable bearings 51A is mounted a shaft 52 which is oscillatable by means of a handle 53 fixed to one end thereof and extending from the housing or by means of a solenoid 54, the core 55 of which is linked to a crank arm 56 carried by shaft 52 (see Fig. 15).

Figures 15, 16, 17, 18:
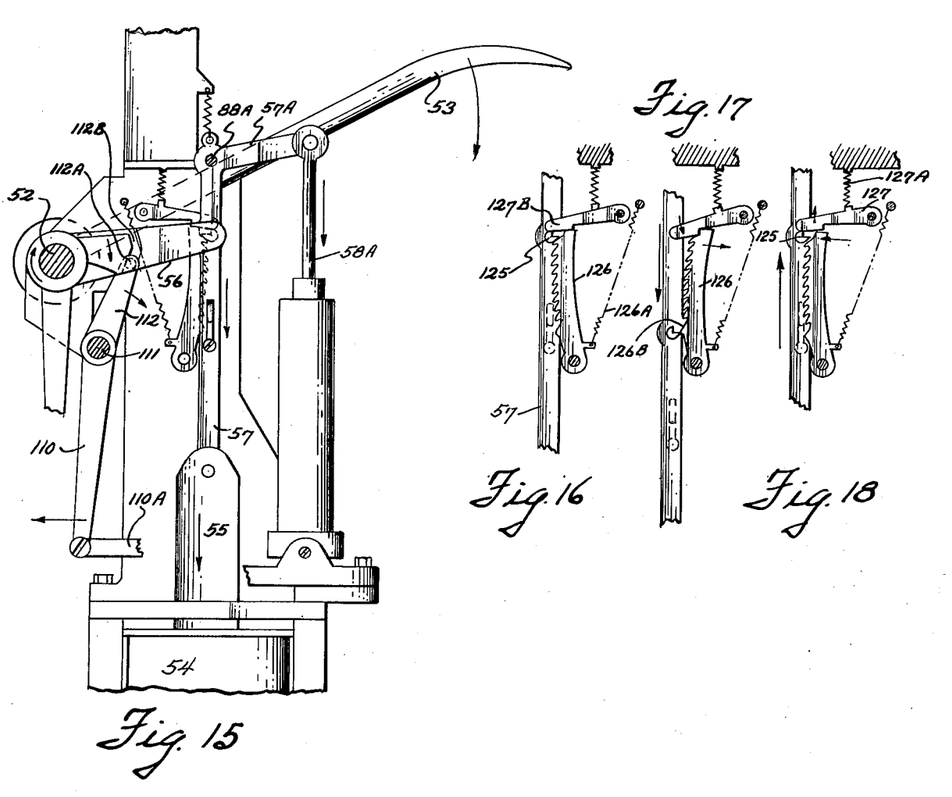
Figure 15 is a side elevation of actuating means for the mechanism showing both hand operating means and electrical operating means.
Figures 16, 17 and 18 are detail views of the non-reversing means in three positions.
Figure 19:
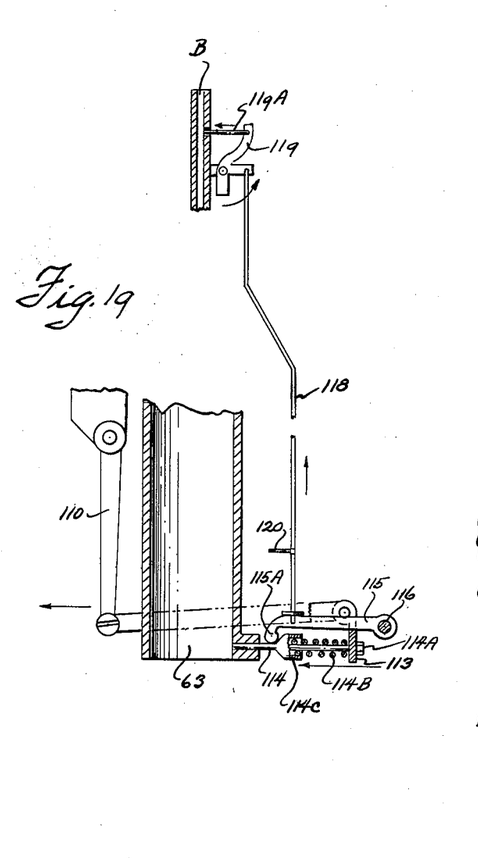
Figure 19 is a detail view showing means for detecting the lack of change in a tube.
Figure 20:
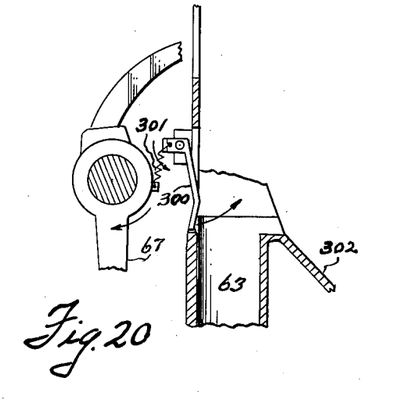
Figure 20 is a detail view of means for bypassing coins when the tube is full.
Figure 21:
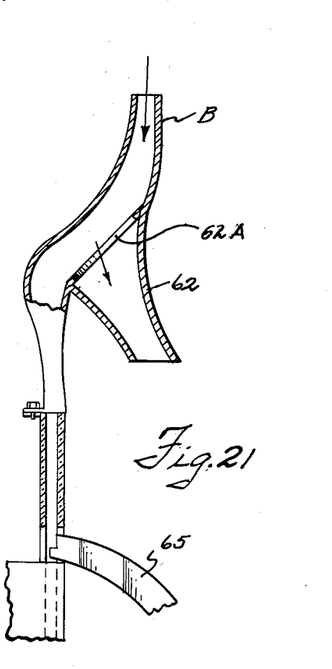
Figure 21 is a detail of the coin or token chute.

The link 57 connecting core 55 and arm 56 is provided with a lateral extension 57A connected to the plunger 58A of a suitable dashpot 58 adapted to delay action both ways.

From the top of the assembly, and extending downwardly to a point somewhat above the level of shaft 52, are a plurality of coin chutes 60, 60A, 60B and 60C. These are open to and register with the slots B, B1, B2, B3 in the casing which are shown as marked respectively "token," "50-25," "10," and "5" and in the present form of the machine, are adapted to receive tokens and the coins indicated, "quarters" and "halves" going into the same slot.

These chutes are of a width to take the particular coins indicated and two of them 60A and 60C (marked respectively 50-25 and 5, respectively) are provided with bypass chutes 62 so that coins of smaller size than the proper ones will not pass through the mechanism but will be bypassed directly to the pocket D. Access of the coin to the chute 62 is through an opening 62A in the lower wall of the chute 60A or 60C, these chutes being inclined for this purpose.

Opposite the lower ends of chutes 60A, B, and C, are change receiving tubes 63 of such diameters as to take loosely nickels, dimes, and quarters, the tokens and halves, after fare registration, dropping directly into the receiver R and removable through door G.

Referring first to the two intermediate slots and their accompanying mechanism, these are the 50-25 and the 10 slots and are provided with similar mechanism, with the exception of the means for distinguishing between the quarters and halves.

When a coin is dropped into either chute, it falls to the lower end thereof to the position indicated by the dotted circles where it is stopped and held by one of the fingers 65, there being one of these in the dime chute and two in the other so positioned that one of them catches a quarter and the other a half-dollar, neither being contacted by a coin of the other denomination.

Figure 13:
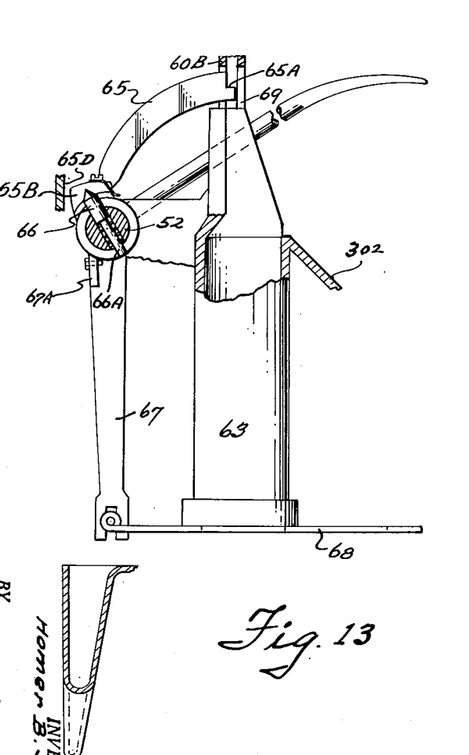
Figures 13 and 14 are elevations, with parts in section, showing the operation of the change making mechanism.
Figure 14:
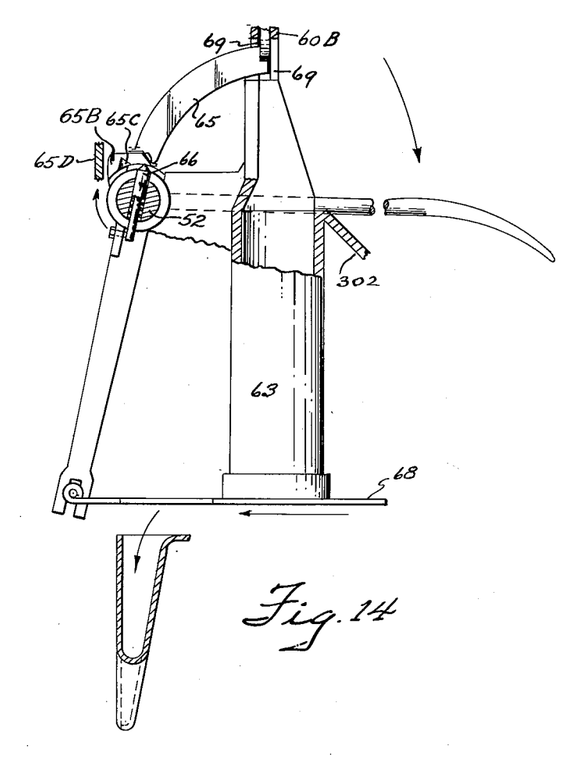

As shown in Figures 13 and 14, these fingers are each provided with a notch 65A in their ends and when in idle position, rest with the notch in the chute, this latter being provided with openings 69 through which the finger may move freely unless a coin is in the notch. Of course, with a coin in the notch, as in Figure 14, the finger 65 is held by the coin against movement.

These fingers 65 are mounted for free movement on shaft 52 and operable thereby through an automatic clutch shown in section in Figures 13 and 14. They are each provided with a bearing portion 65B in which, adjacent the shaft 52, is a notch 65C and the shaft at this point has mounted in it a pointed end plunger 66 urged toward the notch by a suitable spring but capable of receding sufficiently to be disengaged from the notch 65C.

The rear end of plunger 66 is provided with a stem portion 66A long enough to extend well beyond the shaft when the plunger is disengaged from the notch. This stem 66A is adapted to strike a lug 67A carried by an arm 67 swingably carried by shaft 52, so that when the shaft 52 is rotated, if a coin is in the notch 65A and the finger is thereby held against movement, the plunger 66 is forced out of notch 65C, the stem 66A is thrust out and engages lug 67A and swings arm 67. Arm 67 is connected to and actuates a change slide 68.

In its oscillation forward, in the above described action, the parts including the shaft 52 move to the position shown in Figure 14, the finger 65 being held against movement. In the return oscillation, the friction of plunger 66 on the bearing portion of finger 65 causes the latter to swing back and release the coin to drop into its tube 63 and continues to move backward until it strikes a stop 65D. The plunger 66 then moves backward until its point starts to enter notch 65C. The plunger 66 then slides into the notch and thereby moves the finger forward to its rest position. The small backward movement of finger 65 of course releases the coin which then drops into its tube 63.

Figure 35:
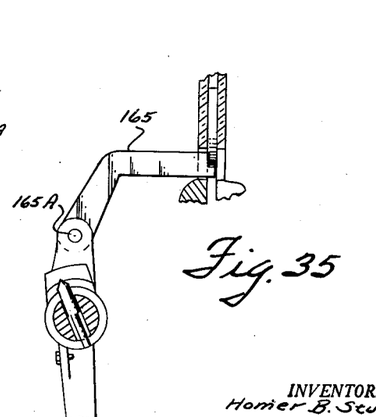

It is obvious that when a finger 65 is not blocked by the pressure of a coin in its chute, it is moved forward by the shaft 52 and plunger 66 and passes through openings 69. While the two intermediate coin chutes are substantially identical except that the one has two fingers 65, the nickel chute differs in the form and action of its finger 165. This is shown in detail in Figure 35, and is shown as being hinged as at 165A to a clutch structure similar to those for arms 67. The forward end of finger 165 is notched as are the others and is shown in its rest or idle position in this figure. Its action and function are similar to those of the other fingers.

If, as is often the case, the fare to be registered is ten cents, the machine should of course be capable of taking and registering such a fare whether it be deposited as a single dime or as two nickels and must, in addition, refuse to register a single nickel. Provision for this function is shown in Figures 31 to 34 showing mechanism to be substituted for finger 165.

In this mechanism a finger 265 is hinged to the clutch mechanism on shaft 52 in the same manner as with finger 165. This finger 265 however has its forward end cut down to provide a portion 265A slidable under a coin which may be resting thereon as in Figure 32, and also to provide a shoulder 265B.

Fixed on a stationary portion of the frame adjacent the chute are a pair of lugs 266 serving as bearings for a small vertical shaft 266A having fixed at its lower end a lever or arm 267 and at its upper end a second lever 268 in the end of which is pivoted a rod 268A, which, in idle position, extends into the near wall of the chute, but not into the space therein. Suitable openings will be provided so that the rod may move freely through the chute when there is no coin to block the movement.

Figure 31:
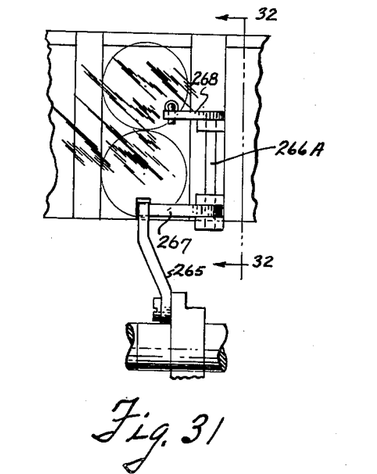
Figures 31 to 35 are detail views of the means adapting the device for fares consisting of two coins of the same value.
Figure 32:
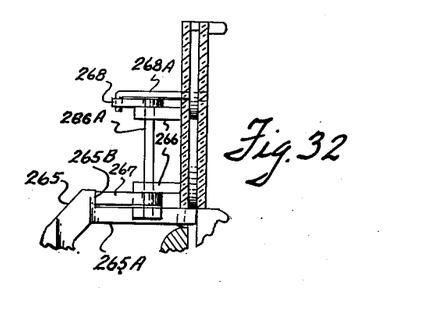
Figure 33:
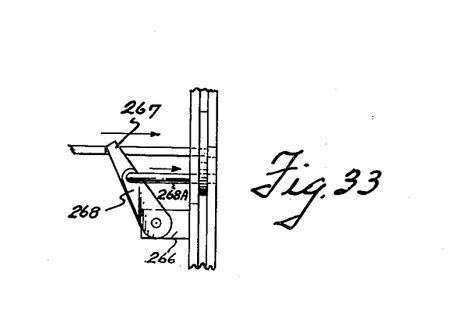
Figure 34:
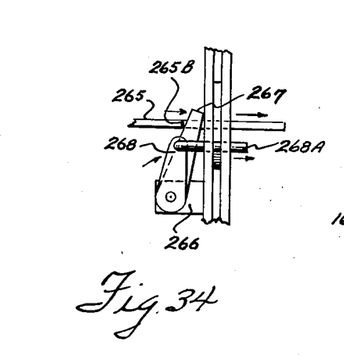

This rod 268A will be in such position as to be blocked in its movement by a second coin in the chute as shown in Figure 31. If a single coin is in the chute when the oscillation of shaft 52 occurs, both the finger 265 and the rod 268A will pass forward freely. However, if a second coin is present, the movement of rod 268A and, therefore, the finger 265 will be blocked against forward movement and the clutch on shaft 52 released as described above.

In the case of a ten cent fare, of course the change slides will also have to be altered so as to deliver, instead of one or two nickels as is described later, only one nickel under any deposit and, of course, none when a dime is deposited.

In the token chute, there will also be a finger such as finger 165 and operating in similar fashion.

Referring now to Figures 8 to 12, these show the change slides and their operation in making change for the greater than fare coins, assuming a five cent fare.

When a five cent fare is being used, and a nickel is placed in its proper slot, no change is, of course, given. However, with the deposit of a dime, quarter or half dollar, change must be returned and in the present invention, the change for a dime is obviously a nickel, but the change for a quarter is made by returning a dime and two nickels and the change for a half dollar is a quarter, a dime and two nickels. This requires means for delivering a single nickel or for delivering two nickels depending upon whether or not there is deposited a dime or one of the higher coins.

Each of the coin tubes 63 is closed at its bottom by means of a hinged door 75 supported in closed position by a sliding member 75A accessible from within the coin receptacle R. When the member 75A is withdrawn to the dotted line position (Figure 8), the door drops to the dotted line position and all of the tube contents fall into the receptacle. Immediately above the door 75 or bottom of each tube 63 are positioned the change slides 76, 76A and 76B, the first being in the nickel tube and consisting of two slides 76B, and 76C. These slides consist of relatively long metal plates each of a thickness corresponding to the thickness of the respective coin and each provided with an opening 77 of a size to receive the coin.

The slide 76C, for nickels, is provided on the edge adjacent the dime slide with a pair of spaced lugs 78 between which lies a single lug 78A carried by the dime slide so that any movement of the dime slide forward or backward carries with it the nickel slide 76C. On the other side of the dime slide 76A, adjacent the quarter slide, is a lug 79 lying behind a similar lug 79A carried by the quarter slide 76B so that, when the quarter slide moves forward, the dime slide 76A is carried forward at the same time, but the dime slide may move forward without taking with it the slide 76B.

As indicated above, the nickel slide 76 consists of two slides one above the other, and has the lugs 78 on the lower one. The upper one is connected to an arm 67 while the lower slide 76C is slotted as at 76D in its forward end. A pin or screw 76E is fixed in slide 76B and extends into the slot 76D, near its inner end. When, therefore, the slide 76C is carried forward by the lugs 78 and 78A, it carries with it the slide 76B. On the other hand, when the slide 76B is moved forward by its arm 67, the slide 76C does not move and a single nickel, the second one in tube 63, is delivered.

As stated above, the machine may be adapted for either hand or electric operation. In Figure 15, a hand lever 53 is shown, as is also a solenoid 54, either adapted to oscillate the shaft 52 which is the actuating shaft for the entire structure.

In order to energize the solenoid 54 and do so automatically and at the proper time, a suitable switch and coin controlled switch actuating means is shown.

Mounted within receptacle R is a hand switch 80, one terminal 80A of which is connected to a suitable source of electric current and the other terminal 80B to one post 54A on the solenoid 54. From the other post 54B on the solenoid a lead 81 extends to one pole of a suitable switch 82 from the other pole of which a lead 83 extends to the return to source.

The switch 82 is preferably of the type sold under the name of "micro-switch" and is an enclosed snap switch actuable through a projecting slidable pin 82A (see Figs. 25–27) and requires only an exceedingly small movement of the pin inwardly to close the switch.

The necessary movement of the pin 82A is in the present device accomplished by an arm 84 pivoted at 84A and carrying a roller 84B adapted to coact with a cam 85 carried upon a shaft 86 and oscillatable therewith.

Figure 25:
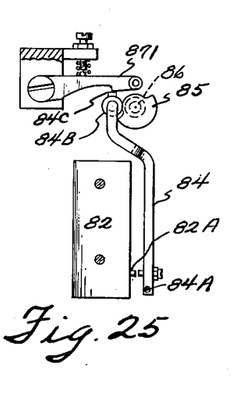
Figures 25, 26 and 27 are detail views showing the switch actuating means in three positions.
Figure 26:
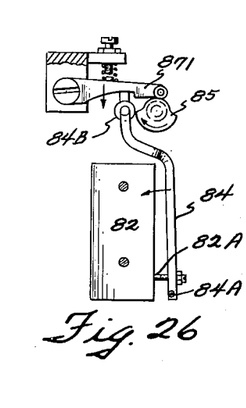

The shaft 86 and cam 85 are oscillated, by means described later, from the position of Figure 25 in which the circuit is "open" to the position of Figure 26 in which the circuit is "closed." In moving from the open to the closed circuit positions, the upper end 84C lifts a pawl 87I adapted to retain the arm 84 in closed circuit position until the cam is oscillated back until its high side again lifts the pawl and allows arm 84 to swing to open circuit position with the roller 84B resting on the low portion of the cam (see Fig. 27).

The cam 85 is fixed at the end of shaft 86 mounted for oscillation at the rear of the machine in bearings carried by brackets 86A. Shaft 86 has fixed to it a plurality of short arms 87, 87A, 87B and 89 of which the last is located adjacent the link 57 and extends forward to a position in which it is moved downwardly by a pin 89A, fixed to link 57, as the latter is moved down by the operation of the solenoid 54 or handle 53. This movement is the re-setting movement of shaft 86.

Adjacent each of the arms 87, 87A and 87B on shaft 86 is loosely mounted a pawl member 88, there being two of these adjacent arm 87A, one on each side of the latter. These pawl members 88 are each provided with two arms 88A and 88B arranged at an angle to each other, the arm 88B extending generally downward and the arm 88A extending generally forward. Suitable springs 88C urge these pawls clockwise as viewed in Figures 22–24.

Figure 5:
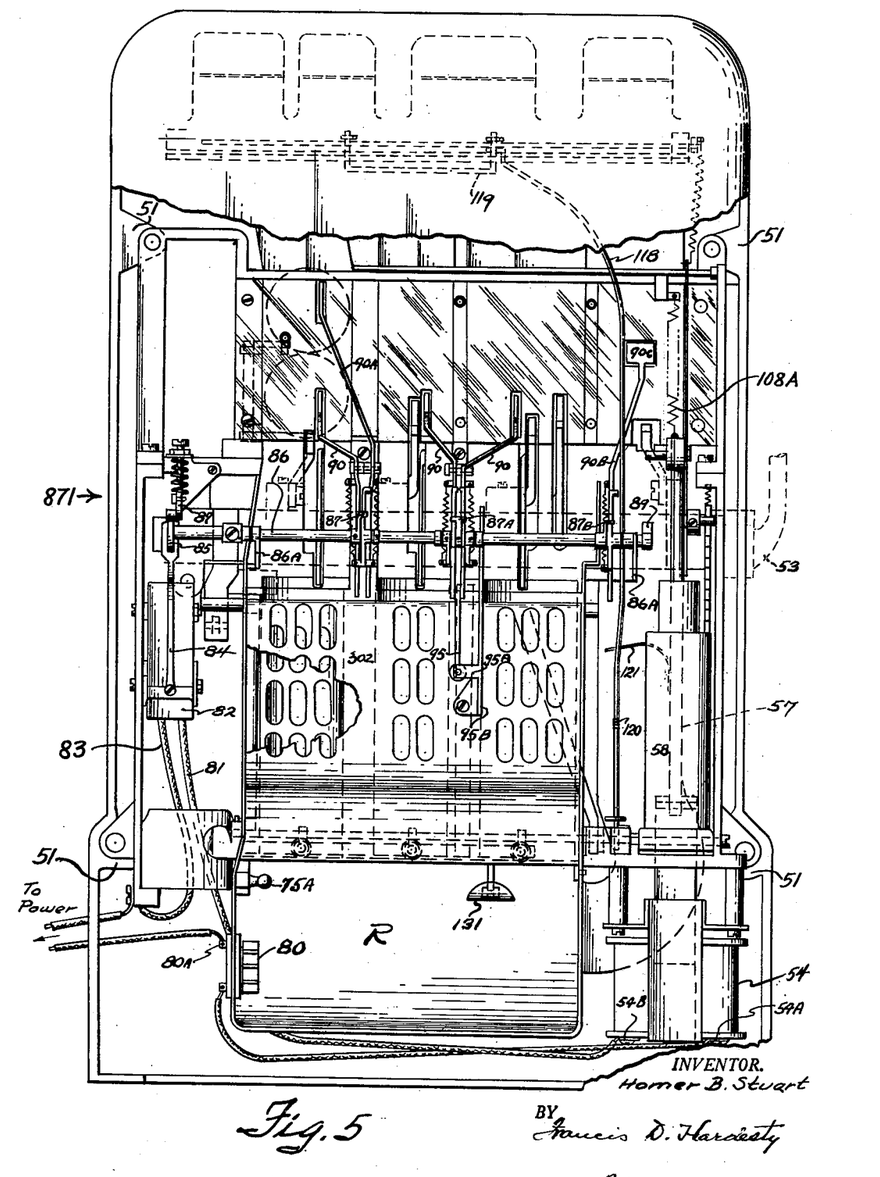
Figure 5 is a rear elevation of the same.
Figure 6:
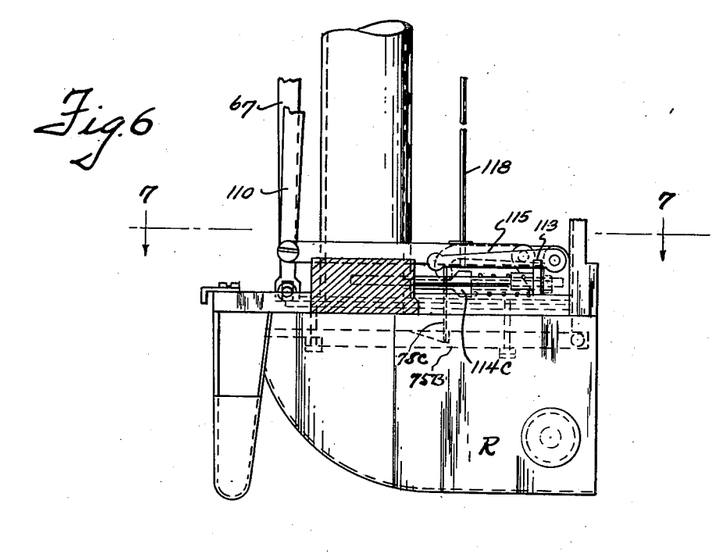
Figure 6 is a side elevation of the change making mechanism.
Figure 7:
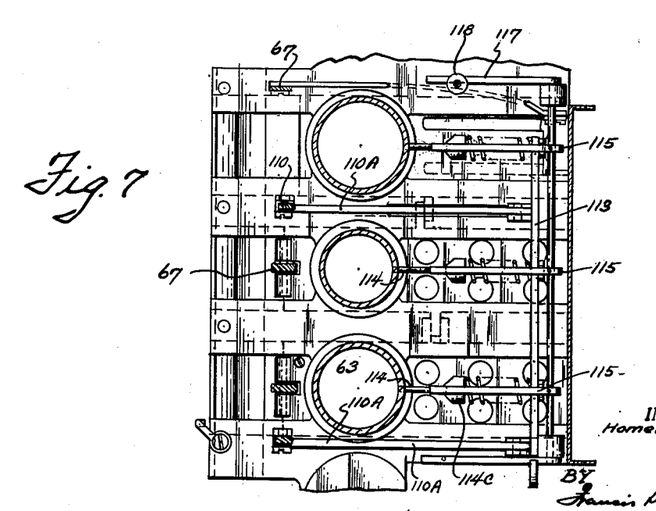
Figure 7 is a section on line 7—7 of Figure 6.
Figure 8:
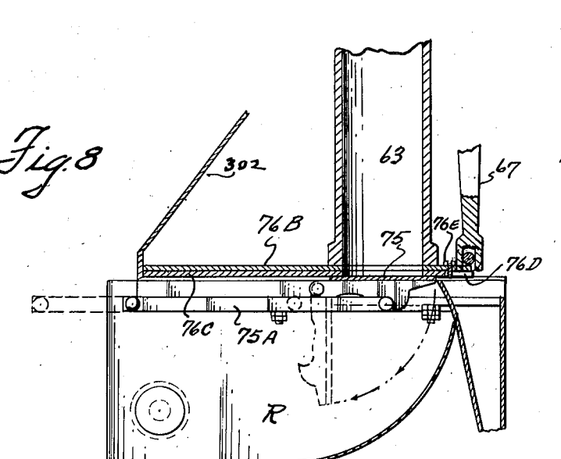
Figure 8 is a sectional view showing the dumping means for the change tubes.
Figure 9:
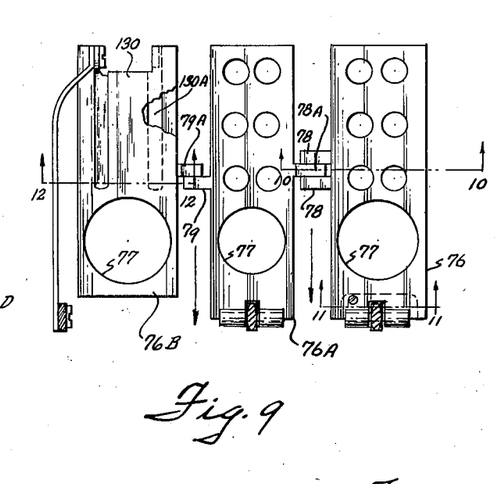
Figure 9 is a plan view of the change slides.
Figures 10, 11, 12:
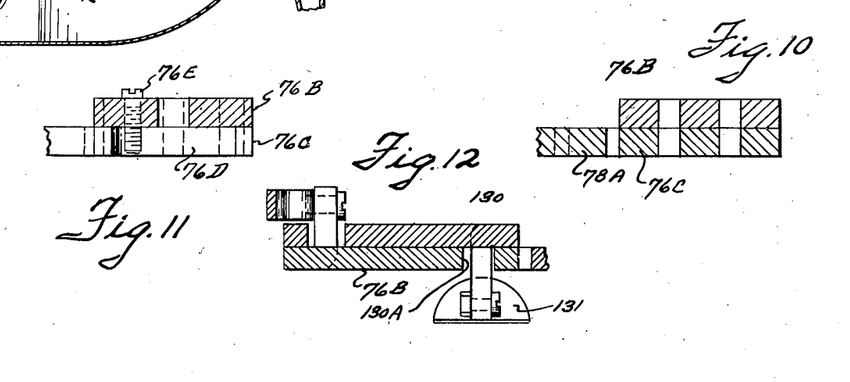
Figure 10 is a section on line 10—10 of Figure 9.
Figure 11 is an enlargement of a portion of Figure 8.
Figure 12 is a section on line 12—12 of Figure 9.
Figure 22:
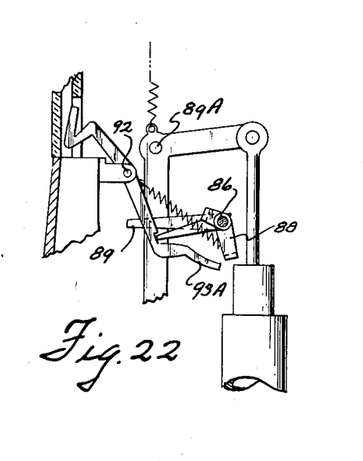
Figures 22, 23 and 24 are detail views of the electric circuit control means showing three positions.
Figure 23:
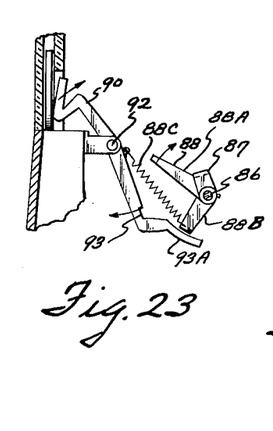
Figure 24:
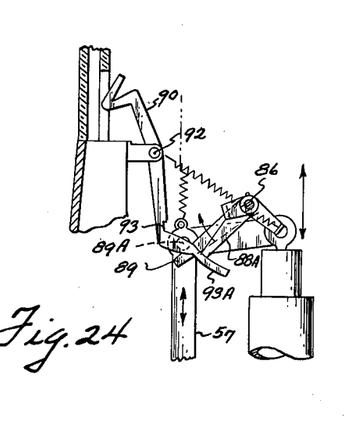
Figure 24A:
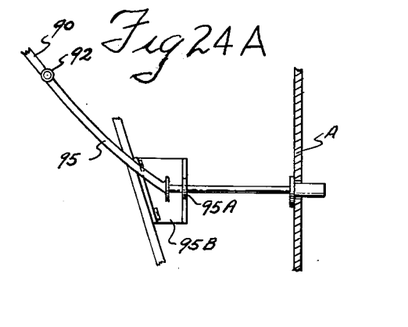
Figure 24A is a fragmentary view showing a hand control.

These pawls are adapted to coact with triggers 90, 90A, and 90B, there being three triggers 90, one adjacent each of three chutes for coins. The trigger 90A is also adjacent the nickel chute and the trigger 90B adjacent the token chute. The several triggers are pivoted as at 92 just below the ends of the several chutes and are all identical below their pivot points. Above the pivot points the triggers 90 are identical except they may have a somewhat different lateral deflection to provide for the proper location of their upper ends. The triggers 90A and 90B are longer than the others as shown in Figure 5, and the latter one (90B) provided with a pad 90C while the others, 90 and 90A, have their upper ends bent downwardly and then up, as shown in Figures 22 to 24. This formation, as shown in Figure 22, allows for the projection of the so formed cam into a chute in position to be moved outward a small distance by a coin, as shown in Figure 23.

The triggers, below the pivot point 92, are, as stated above, identical and each is provided with a notch 93 below which is a curved extension 93A. These triggers coact with the pawls 88 as follows: When the machine is idle, the arm 88A of the pawl rests in the notch 93 with the parts in the position of Figure 22, and in this position the shaft 86 carrying cam 85 is in the position shown in Figure 25. When, however, a coin is inserted in the chute and moves the trigger outwardly, the arm 88A is released from the notch 93 and due to spring 88C the pawl rotates to the position shown in Figure 23 and, in so doing, carries upward the arm 87 fixed to shaft 86 and thereby moves cam 85 to the position of Figure 26. This closes the circuit through switch 82.

Further, when the pawl 88 moves to the position of Figure 23, the arm 88B moves into contact with the curved extension 93A of the trigger to hold the latter away from the coin and thereby not interfere with the passage of the latter when released by finger 65.

Figure 24 shows the re-setting of the triggers, and shows that, when the shaft 86 is oscillated forwardly by the action of pin 89A on arm 89, the pawl 88 is carried along until the arm 88B has cleared the extension 93A and the arm 88A has contacted the latter. When the return oscillation occurs, the arm 88A of course moves back to notch 93.

Figure 27:
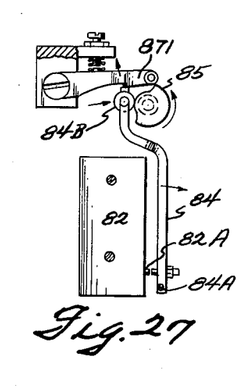

The re-setting position and corresponding position of cam 85 are shown in Figures 24 and 27, and also indicate the "open" position of switch 82.

As mentioned above, the trigger 90A is longer than its adjacent trigger 90 and both are in position to be actuated from the nickel chute. When a single nickel constitutes a fare, the longer one need not be used. When two nickels constitute a fare, both triggers must be tripped in order to actuate the switch 82. This may be accomplished by making the end of pawl arm 88A sufficiently wide to coact with the notches 93 in both of triggers 90 and 90A.

Further, in order to permit the attendant to inspect a dime, quarter, or half dollar before registration, and while it rests in the bottom of chute between the transparencies, the triggers 90 in the two intermediate chutes likewise control a single pawl arm 88A so that both must be tripped before the pawl flies up and rotates the cam 85.

Since these two chutes can not have coins in them, because of later described structure, a coin in either will therefore not release the pawl. Accordingly a manually operable trip is provided so that after inspection the attendant may trip both triggers and thereby allow the machine to complete its operation.

This manual release is shown as a small lever 95 lying between these two triggers and pivoted conveniently at 92 and carrying lugs adapted to depress the triggers when itself is depressed. This may be accomplished by means of a solenoid operable by a suitable button or mechanically by a button extending through from the outside of the housing. A guide for such a button or rod tipped with a button is shown at 95A carried on a suitable bracket 95B.

The description and operation so far relate to the operation of depositing a coin and dispensing change if necessary when properly done. There are, however, certain precautionary features necessary in order to prevent deposit of the second coin before the register of the first to prevent the deposit of a coin of larger denomination when there are insufficient coins for change, and of course, the method of properly registering a fare. Means is also provided for preventing the return stroke of the parts before a complete stroke has been made.

Figure 36:
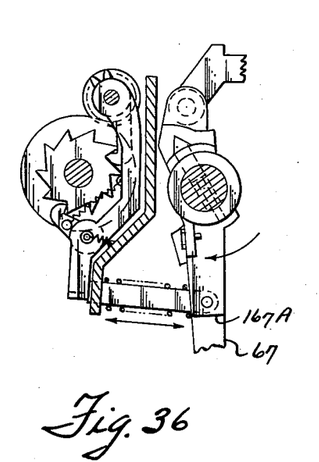
Figures 36, 37 and 38 are details of the fare register.
Figure 37:
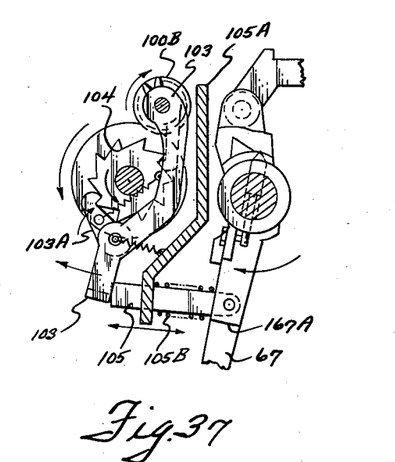
Figure 38:
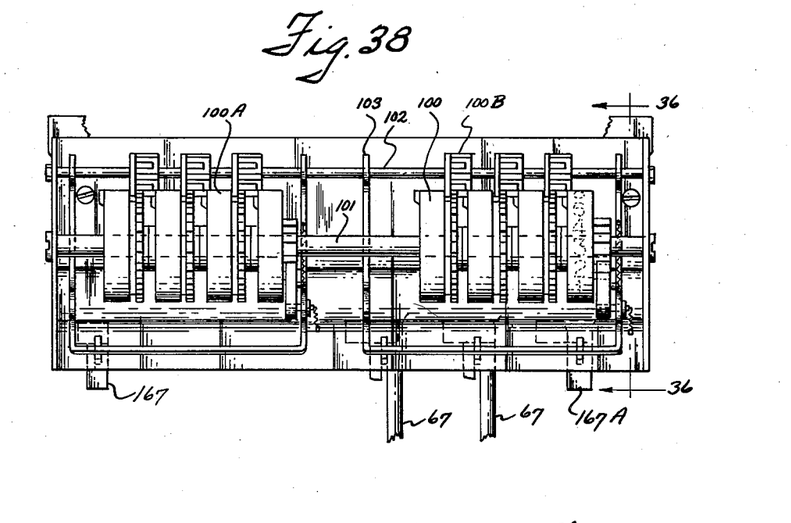

Taking up first the fare register, this is accomplished by the mechanism shown in Figures 36 to 38. In these figures, two sets of indicator wheels are indicated at 100 and 100A. These operate in the usual fashion in that the first wheel is actuated by the foregoing mechanism and each succeeding wheel is actuated by the one preceding it through the use of the intermittent gears 100B.

The two registers are used for the purpose of registering separately cash fares and token fares. In Figure 38 the token fare register is the one at the left. This is actuated from the actuating arm 167, while the other register is actuated through either of arms 67 or arm 167A, the two arms 67 being of course the arms operating the change slides for the dime and quarter slots, while the arm 167 is controlled by a token, and the arm 167A controlled by a deposited nickel. Both registers are constructed and operated in the same fashion so only one will be described.

The several register wheels are rotatable upon a suitable cross shaft 101 and maintained in proper spaced relation in any suitable manner. Above the shaft 101 is a second shaft 102 to which are fixed the intermittent gears 100B and also to which is fixed a stirrup member 103. This stirrup member extends down below the wheels and carries a spring-actuated pawl 103A. This pawl coacts with a ratchet 104 carried by the first wheel of the register.

Referring to Figures 36 and 37, it will be noted that the stirrup 103 when swung backwards, rides over one of the teeth of the ratchet 104, and in its forward movement, advances the register wheel one tooth. One revolution of the first wheel of course moves the second wheel one tooth, and of course one revolution of the second wheel moves the third register wheel one tooth. The swinging of the stirrup 103 in the case of the right-hand register is, as stated above, accomplished by either of the arms 67 or 167A. Each of these is provided with a plunger 105 slidable in a suitable frame member 105A and surrounded by a suitable spring 105B to accomplish its return and to accomplish the return of the arm. The arms 167 and 167A do not extend downwardly but a short distance and of course do not connect with a change operating slide.

Figure 28:
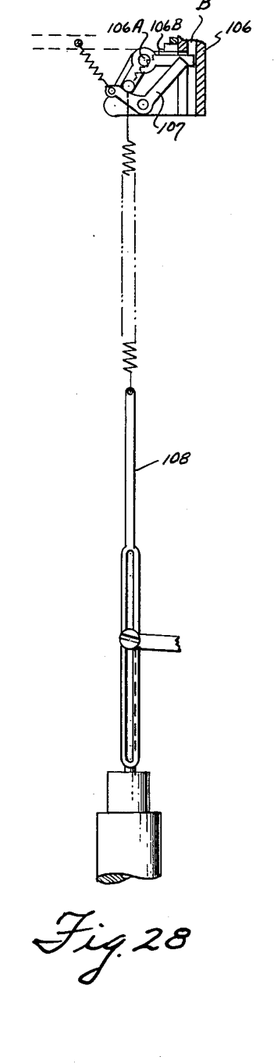
Figures 28, 29 and 30 are detail views showing three positions of the slot blocking means.
Figure 29:
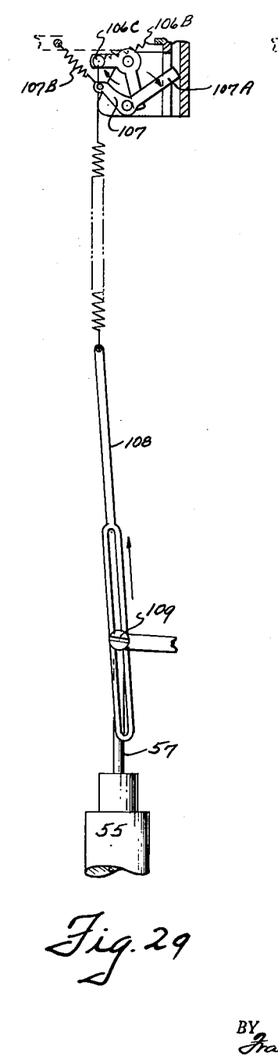
Figure 30:
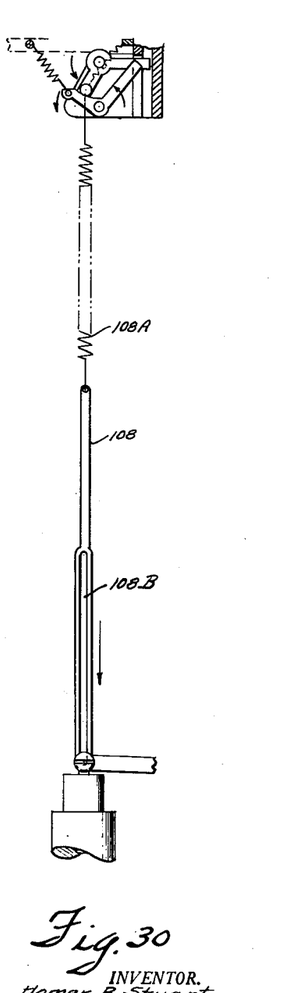

In order to lock up the several coin slots including the token slot, the mechanism shown in Figures 28 to 30 is used. In these figures, the coin chute B at the top of the machine is shown as having projecting thereinto one arm of a lever 106 pivoted at 106A, and provided with a spring 106B so connected to the lever as to throw it over center when a coin is deposited. The other arm of lever 106 carries a small pin 106C to which the spring is attached and also serves as a means of blocking the movement of a second lever 107. When a coin is deposited in the chute B, the lever 106 is moved out of the way to permit the coin to proceed in the slot, and at the same time, the lever 107 is released allowing its end 107A to enter the slot through the action of a spring 107B. This lever 107 is so pivoted that an attempt to insert a second coin in the slot is blocked by the end of the lever.

While the operation of the machine is taking place, the levers 107 continue to block insertion of either a coin or a token. However, the levers 106 and 107 must be re-set for the next insertion, and this is accomplished by means of a link 108 which is connected through a spring 108A to the pin 106C carried by lever 106. The lower end of the link 108 is slotted as at 108B and coacts with a pin or screw 109 movable in the slot and carried by link 57 connected to armature 55. The slot 108B is of such length that the link 108 is not moved until the link 57 has almost completed its downward movement. When this occurs, the lever 106 is rotated about its pivot and the pin 106C acting on the third arm of lever 107, restores the two levers 106 and 107 to the rest position as shown in Figures 28 and 30. Each of the chutes will be provided with the levers 106 and 107 fixed to common shafts so that insertion of a coin or token will block all chutes.

In order to prevent the insertion of a change requiring coin when insufficient change is present in the tubes 63, mechanism is provided for detecting the lack of change and for blocking the two intermediate chutes. This mechanism is shown in Figures 4, 6, 7, 15 and 19. In these figures, there is shown two arms or levers 110. These two levers 110 are fixed to a shaft 111 and also fixed to the shaft is a lever arm 112 which extends upwardly and carries a laterally projecting pin 112A (see Figure 15) which coacts with a cam slot 112B in the side of the lever 56, which, as mentioned above, oscillates shaft 52. With each operation of the machine the levers 110 are swung backwards a short distance and through the action of links 110A carry with them a cross bar 113. This cross bar has extending through it three pins 114 which extend loosely through the bar and through suitable openings into the lower ends of the change tubes 63. These pins 114 are spaced from the bottom of the chute so that they will clear the lowest coin in each chute but strike the second. Each of the pins is provided with a suitable head 114A to limit its forward movement and is spring pressed toward the tube by a suitable spring 114B and each pin carrying cam member 114C which serves also as a stop for the spring 114B.

Mounted above the bar 113 and independent of it, is an arm 115 fixed to the shaft 116, and there is an arm 115 for each of the several coin tubes. These arms 115 are fixed to shaft 116, and to the latter is also fixed a fourth arm 117. As the bar 113 is moved forward, the pins 114 will enter the tubes 63 unless there is a sufficient number of coins to block its inward movement. If anyone of the tubes 63 lacks coins, its pin 114 will be moved forward into the chute by the bar 113. When this happens, the cam follower end 115A will be lifted by the cam 114C and when this happens, the fourth arm 117 lifts a suitable rod 118 which extends up to near the top of the coin chute B and coacts with a small bell crank 119 carrying the plunger 119A of which there are two with one in each of the two higher denomination slots; that is, the dime and quarter slots. The rod 118 will remain in its upward position through friction until it is restored and in the meantime of course no further coins can be put in these two chutes. Re-storing the rod 118 to its lower position is accomplished through providing it with a small rigid arm 120 extending laterally therefrom, and adapted to coact with a spring 121 carried by the link 57 as the latter is moved down in the operation of the machine.

In Figures 15 to 18, means is shown for insuring the complete stroke of the machine before it may be returned. These figures show that the link 57 is provided with a pin 125 having an edge portion adapted to coact with a swinging rack, the rack being urged towards the pin 125 by a spring 126A. As the link 57 moves downwardly, any attempt of the parts to return will of course be blocked by the pin 125 hooking in the teeth of rack 126. However, in order to permit the return, the rack 126 is curved and at the end of the rack a cam 126B is provided. Through the action of the pin 125 on the cam 126B, the rack is moved a greater distance backward than is accomplished by the rack teeth. When the rack has been moved backward by the cam 126B, it is maintained in this rearward position by a latch 127 pivoted above the rack and spring pressed downwardly by a suitable spring 127A, which latch drops over the end of the rack and maintains it out of the way of pin 125 until the latter returns to its topmost position and lifts the end 127B of the latch.

In the use of the present machine, it sometimes happens that a fare payer is without a suitable coin and the attendant is required to provide change for paper money. If the attendant is not at the same time provided with sufficient coins while there are coins in the machine, means is provided to enable him to extract from the quarter tube a sufficient number of coins to enable him to make change. This means is shown in Figures 4, 5, 9 and 12. In these figures there is shown a second change slide 130 mounted on top of the change slide 76B, and movable through the use of a suitable finger-piece 131 which projects into the receiver R. In order to permit this, the slide 76B is provided with a suitable slot 130A so that the slide may be moved without interfering with the position or movement of slide 76B.

When, as it sometimes happens, the tubes 63 become filled and no more coins can be added, additional coins are shunted into the receiver R. This is accomplished by means of the small arms 300 pivotally mounted just above the tubes 63 normally out of the way of coins falling into the tubes and actuable through light springs 301 from the hubs of fingers 67. When a tube 63 is completely filled, the arm 300 will either prevent the addition of another coin or will push such coin over upon the sloping apron 302 which extends down to near the receiver R and causes the coin to fall into the latter.

As described above in connection with Figure 8, the dumping member 75A is used to drop all of the coins into the receiver R. This member has also another function. It blocks the insertion of further coins until the machine is operated by the lever 53 or solenoid 54.

To accomplish this function the member 75A is provided with a cam portion 75B (see Fig. 6) adapted to lift lever 115 through the action of a sliding rod 75C and thereby actuate member 118 to close the upper ends of the coin slots.

It should be noted that suitable springs not referred to by number or letter will be used to return the several parts to idle position.

Now having described the invention and the preferred embodiment thereof, it is to be understood that said invention is to be limited, not to the specific details herein set forth and described, but only by the scope of the claims which follow.

I claim:

1. In a change making fare register, a coin chute, a coin holding receptacle and a change ejecting slide closing the lower end of said receptacle, an actuating shaft, a change slide operating arm rotatably mounted on said shaft, a finger also rotatably mounted on said shaft and having its free end notched and extending into said chute whereby a coin in said chute in said notch will prevent movement of said finger upon shaft rotation, cam means carried by said finger adjacent said shaft, a cam actuable element carried by said shaft and actuated by said cam when said shaft is rotated relative to said finger and means carried by said element and cooperating with the slide operating arm to actuate the latter.

2. In a change making fare register, an actuating shaft adapted to be oscillated, a plurality of coin chutes and coin receptacles, coin ejecting means for certain of said receptacles, fingers carried by said shaft and adapted to move freely transversely through said chutes in absence of coins therein but be blocked from movement by the presence of a coin, clutch means carried by said shaft and adapted to connect the latter in operating relation to said coin ejecting means, and means for rendering said clutch means operative when said shaft is oscillated relative to a finger.

3. In a fare register and change maker, an actuating shaft, electrically operable means for oscillating said shaft, a normally open electric circuit including the latter, an oscillatable circuit controlling shaft having fixed thereto a switch operating cam, a switch in said circuit and operable by said cam, spring means biased to urge said controlling shaft and cam to switch closing position, trigger means adapted to withhold said cam, and coin actuated release means for said trigger.

4. In a change making fare register, a plurality of coin chutes, a finger movable transversely through each, an oscillatable shaft, said fingers being rotatably mounted on said shaft, change ejecting mechanism including a plurality of actuating arms rotatably mounted on said shaft each adjacent a finger, and clutch means associated with said fingers and arms and adapted to operatively connect either a finger or an arm to said shaft.

5. In a change making fare register, a change ejecting slide, an operating arm therefor, an oscillatable actuating shaft upon which said arm is rotatably mounted, a finger member also rotatably mounted on said shaft, a spring-pressed plunger extending through said shaft and having a pointed end, said finger having a notch adapted to cooperate with said pointed end whereby to releasably connect said finger to said shaft but permit relative movement when movement of said finger is prevented, and means on said operating arm adapted to cooperate with the other end of said plunger and be moved thereby when, through relative movement of the shaft and finger, the pointed end of said plunger is forced out of said notch.

HOMER B. STUART.

REFERENCES CITED

The following references are of record in the file of this patent:

UNITED STATES PATENTS

| Number | Name | Date |
|---|---|---|
| 1,014,515 | Pim et al. | Jan. 9, 1912 |
| 1,152,806 | Green | Sept. 7, 1915 |
| 1,399,650 | Purdue | Dec. 6, 1921 |
| 1,647,180 | Kindrat et al. | Nov. 1, 1927 |
| 1,782,666 | Ross | Nov. 25, 1930 |
| 1,799,056 | Miller et al. | Mar. 31, 1931 |
| 1,861,384 | Fleischer | May 31, 1932 |
| 1,867,429 | Walker | July 12, 1932 |
| 1,926,232 | Gilmore | Sept. 12, 1933 |
| 1,942,618 | Scott et al. | Jan. 9, 1934 |
| 2,087,787 | Stuart | July 20, 1937 |